United States Patent [19]
Larkin

[11] Patent Number: 5,884,668
[45] Date of Patent: Mar. 23, 1999

[54] PLUMBING TOOL FOR TEMPORARILY PLUGGING A PIPE

[76] Inventor: Brent H. Larkin, 6749 W. Quinella Dr., Las Vegas, Nev. 89103

[21] Appl. No.: 937,880

[22] Filed: Sep. 25, 1997

[51] Int. Cl.[6] ................................................ F16L 55/11
[52] U.S. Cl. .......................... 138/89; 138/90; 220/235; 4/295
[58] Field of Search ...................... 138/89, 90; 220/235; 4/295

[56] References Cited

U.S. PATENT DOCUMENTS

| | | | |
|---|---|---|---|
| 1,616,392 | 2/1927 | Provost | 138/90 |
| 1,747,933 | 2/1930 | Goodman et al. | 138/94 |
| 1,993,307 | 3/1935 | Nicholson | 138/89 |
| 2,923,323 | 2/1960 | Franck | 138/89 |
| 5,038,818 | 8/1991 | Jiles | 138/89 |
| 5,099,868 | 3/1992 | Weber | 138/89 |
| 5,363,881 | 11/1994 | Larkin | 138/89 |
| 5,365,976 | 11/1994 | Tozer | 138/89 |

*Primary Examiner*—Denise L. Ferensic
*Assistant Examiner*—James F. Hook
*Attorney, Agent, or Firm*—Drummond & Duckworth

[57] ABSTRACT

The invention is directed to a plumbing tool for temporarily plugging a pipe which normally contains fluid or gas under pressure. The plumbing tool includes an elongate threaded rod having proximal and distal ends. A hollow elongate sleeve is disposed around the threaded rod. Similarly, a cylindrical gasket is disposed around the rod between the hollow sleeve and a gasket stop located at the distal end of the elongate rod. The plumbing tool further includes an arcuate handle extending proximally from the proximal end of the elongate threaded rod. The arcuate handle is configured to include a radius sufficiently great to permit valves to be telescopically communicated along the entire length of the arcuate handle and along the length of the hollow elongate sleeve.

4 Claims, 2 Drawing Sheets

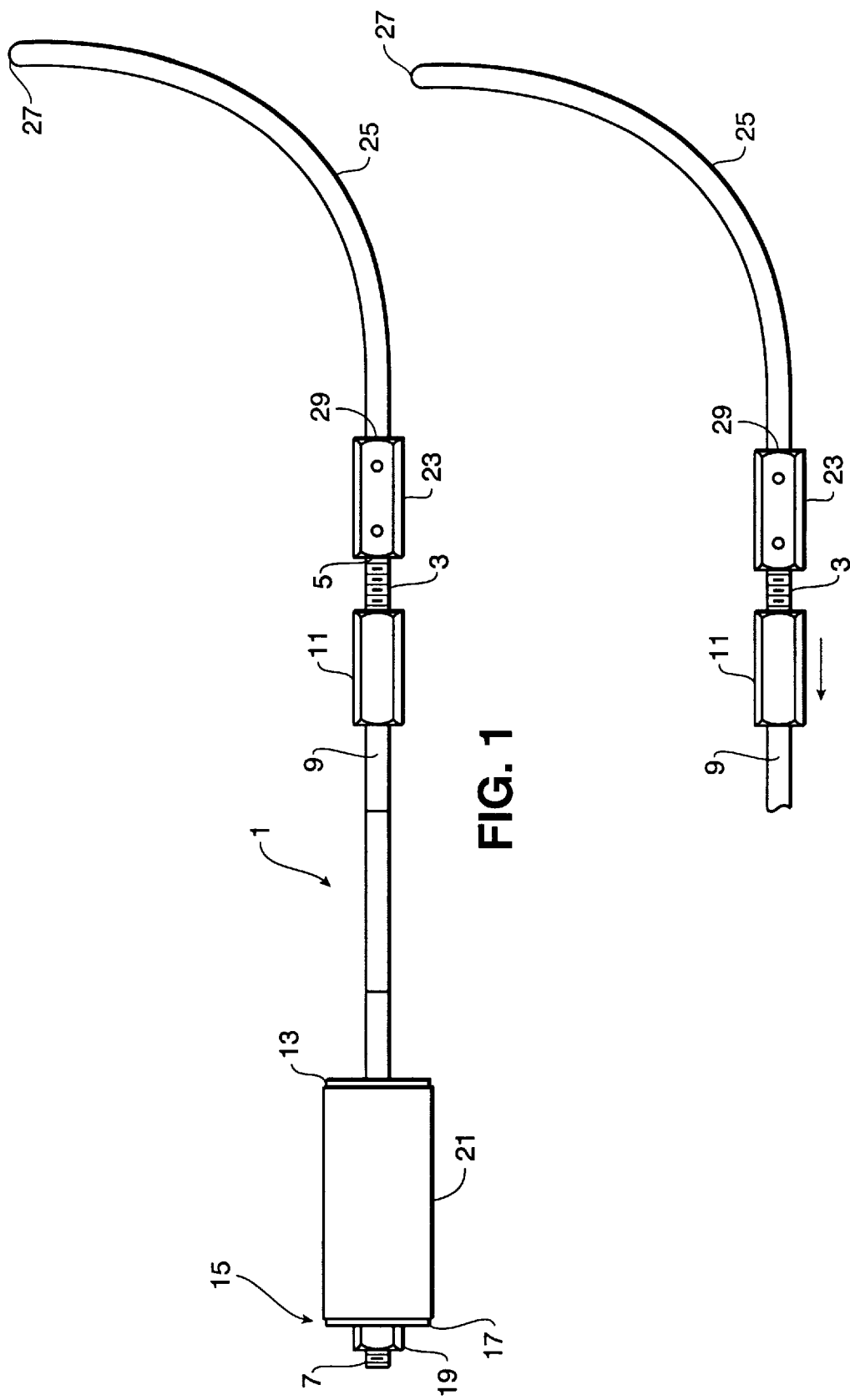

PLUMBING TOOL FOR TEMPORARILY PLUGGING A PIPE

BACKGROUND OF THE INVENTION

This invention relates to a plumbing tool.

More particularly, the invention concerns improvements in plumbing tools of the type used for temporarily plugging water pipes, gas pipes and the like which normally contain fluid or gas under pressure.

In a particular respect, the invention concerns improvements in plumbing tools of a type which utilize a radially expandable cylindrical gasket carried at the end of an elongate rod.

When soldering various sections of pipe together, it is essential that the pipes be completely dry before the soldering begins. If the pipe is wet, then it is nearly impossible to obtain a watertight solder joint. When working with existing plumbing systems, the standard practice is to shut off the water system prior to commencing the start of soldering. However, water within the system often does not drain out easily. The result is that water continues dripping from the pipe long after this water system has been shut off. The dripping of water prevents the plumber from working with a dry pipe in order to obtain a watertight solder joint.

The prior art includes numerous examples of plumbing tools of the general type which involve a radially expandable cylindrical rubber gasket carried on the distal end of an elongate rod which can be inserted through a gate valve into the interior of a water pipe, gas pipe or the like. After insertion within the pipe, axially force is applied to the cylindrical gasket, causing it to expand radially to temporarily plug the interior bore of the pipe. Such tools are disclosed, for example, in U.S. Pat. No. 4,529,007 to Goforth, U.S. Pat. No. 3,993,103 to Hammer, U.S. Pat. No. 2,462,748 to Johnson and in U.S. Pat. No. 1,850,040 to Turner.

As disclosed by the Hammer, Johnson and Turner patents, such tools typically exert axially pressure on the cylindrical gasket by rotation of a threaded elongate rod relative to an internal threaded bushing. Such relative rotation of the bushing, in-turn, exerts axially force toward the distal end of the rod on the intermediate cylindrical sleeve disposed around the rod. The distal end of the sleeve, in-turn, applies axially force in the distal direction which causes compression of the gasket member and, consequently, radially expands the gasket member to plug the bore of the pipe.

Unfortunately, none of these patents disclose a device which permit the temporary plugging of a water pipe and the subsequent desoldering and removal of an unwanted valve or fitting without removal of the plug valve from the pipe. Simply, the tools disclosed in the Hammer, Johnson and Turner patents disclose devices including handle means which are incapable of telescopically receiving the bore of a plumbing valve. For example, the elbow handle of Turner is formed with a radius too small to permit a valve to be received. In addition, Hammer and Johnson disclose handle configurations which are too large to be introduced into the bore of a plumbing valve. Accordingly, none of these devices are configured to permit a valve to be de-soldered from a pipe and thereafter to be removed and replaced while the plug valve is in operation obstructing the flow of water or gas in the pipe.

Alternatively, my prior U.S. Patent, U.S. Pat. No. 5,363,881, discloses a plumbing tool for temporarily plugging a pipe including a rotating handle which is configured to permit the handle to be received within the bore of a gate valve such that the gate valve can be selectively removed or installed to a pipe while the plug valve operates to plug the water or gas pipe. Unfortunately, the rotatable handle disclosed in U.S. Pat. No. 5,363,881 requires moving parts leading to unnecessarily complicated manufacture and expense.

Accordingly, it would be highly desirable to provide a plumbing tool of the general type described above which is adapted to temporarily plug a water pipe or gas pipe which can be maintained in place when a valve is being removed and replaced.

SUMMARY OF THE INVENTION

Briefly, in accordance with the invention, I provide an elongate threaded rod having a proximal end and a distal end. A hollow elongate sleeve is coaxially disposed around and slidable upon the threaded rod, intermediate the proximal and distal ends thereof. A first nut is threadably engaged on the rod proximal to elongate sleeve. Provided on the rod distal of the slidable sleeve is a gasket stop comprising a lock nut and keyed washer. A cylindrical radially expandable gasket is disposed coaxially around the rod between the sleeve and the gasket stop. The cylindrical gasket expands radially when it is longitudinally compressed. Means are provided for advancing the first nut on the rod towards the distal end of the rod to compress the gasket member between the hollow sleeve and the gasket stop.

According to the invention, this type of plumbing tool is improved by providing the plumbing tool with an arcuate handle having a proximal end and a distal end. The arcuate handle engages the proximal end of the elongate threaded rod and is configured such that the proximal end of the arcuate handle extends substantially perpendicular to the axis of the elongate threaded rod. Further, the arcuate handle is configured having a radius sufficiently great to permit plumbing valves, such as gate valves, to be telescopically received on the proximal end of the arcuate handle and communicated along the length of the arcuate handle to be telescopically received on the proximal end of the hollow elongate sleeve.

In a preferred embodiment, the plumbing tool is provided with a gasket stop comprising a washer keyed to the distal end of the threaded rod and a second nut threadably engaged with, but freely rotatable with, respect to the threaded rod. Both the keyed washer and second nut are located distally of the keyed washer.

Accordingly, it is a principal object of the present invention to provide an improved plumbing tool which can utilize a radially expandable cylindrical gasket for temporarily plugging a water pipe, gas pipe or the like.

It is another object of the invention to provide an improved plumbing tool permitting the desoldering, removal, replacement and resoldering of a gate valve to a pipe while maintaining a plug to the interior bore of the pipe.

These and other, further and more specific objects and advantages of the invention will be apparent to those skilled in the art from the following detailed description taken in conjunction with the drawings.

BRIEF DESCRIPTION OF THE DRAWINGS

FIG. 1 is a side view of an improved plumbing tool constructed in accordance with the presently preferred embodiment of the invention;

FIG. 2 is a side view of the arcuate handle of the improved plumbing tool of the present invention;

DETAILED DESCRIPTION OF THE PREFERRED EMBODIMENTS

Figure 4:
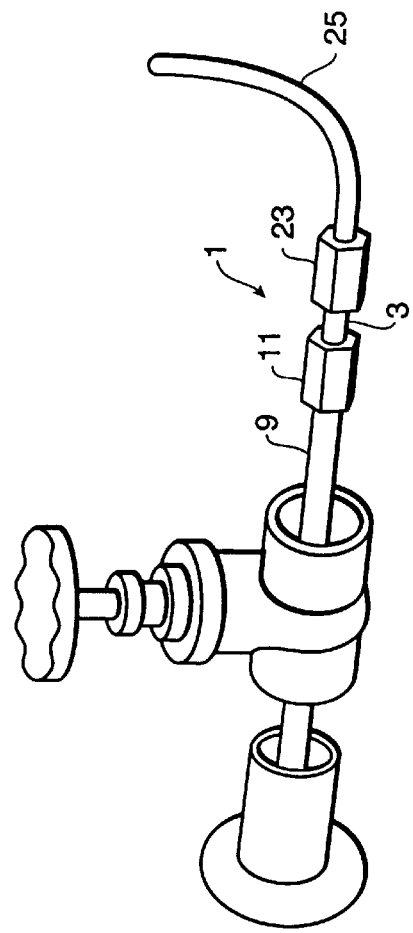
FIG. 4 is a perspective view illustrating the improved plumbing tool of the present invention being inserted through the bore of a gate valve and into the bore of a water or gas pipe with the gate valve disengaged from the pipe.

While the present invention is susceptible of embodiment in various forms, as shown in the drawings, hereinafter will be described the presently preferred embodiment of the invention with the understanding that the present disclosure is to be considered as an exemplification of the invention, and it not intended to limit the invention to the specific embodiment illustrated.

As shown in FIGS. 1 & 2, the plumbing tool 1 includes an elongate threaded rod 3 having a proximal end 5 and a distal end 7. Coaxially disposed around and slidable upon the rod 3 is a hollow elongate sleeve 9. A first nut 11 threadably engages the elongate threaded rod 3 proximal of sleeve 9. The first nut bears on sleeve 9, which, in turn, bears upon washer 13 which is also annularly slidable along the elongate threaded rod 3. Located at the distal end 7 of the elongate threaded rod 3 is a gasket stop 15. The gasket stop is provided with a washer 17 keyed to slidably mate with a notch (not shown) formed longitudinally at the distal end 7 of the elongate threaded rod 3. The gasket stop further includes a lock nut 19 threadably engaged with the threaded rod 3 distal to the keyed washer 17. A cylindrical gasket 21 is annularly disposed around the threaded rod 3 between the distal end of the hollow sleeve 9 and the gasket stop 15.

Engaging the proximal end of the threaded rod 3 is an arcuate handle 25 affixed in place by a coupling 23. The arcuate handle 25 has a proximal end 27 and distal end 29. Of importance, the arcuate handle 25 has a radius sufficiently great to permit plumbing valves such as gate valves or fittings to be telescopically received along the entire length of the arcuate handle to be thereafter capable of being received on the elongate hollow sleeve 9. It will be understood by those in the art that the radius of the handle will vary widely depending upon the configurations of the valve sought to be removed from the pipe and the valve sought to be installed to the pipe. In a preferred embodiment, the arcuate handle has a radius greater than one (1) inch. In an additional preferred embodiment, the arcuate handle has a radius greater than two (2) inches. Furthermore, it is preferred that the arcuate handle 25 extends proximally from the proximal end 5 of the elongate threaded rod 3 such that the proximal end of the arcuate handle extends substantially perpendicular to the axis of the elongate threaded rod.

Figure 3:
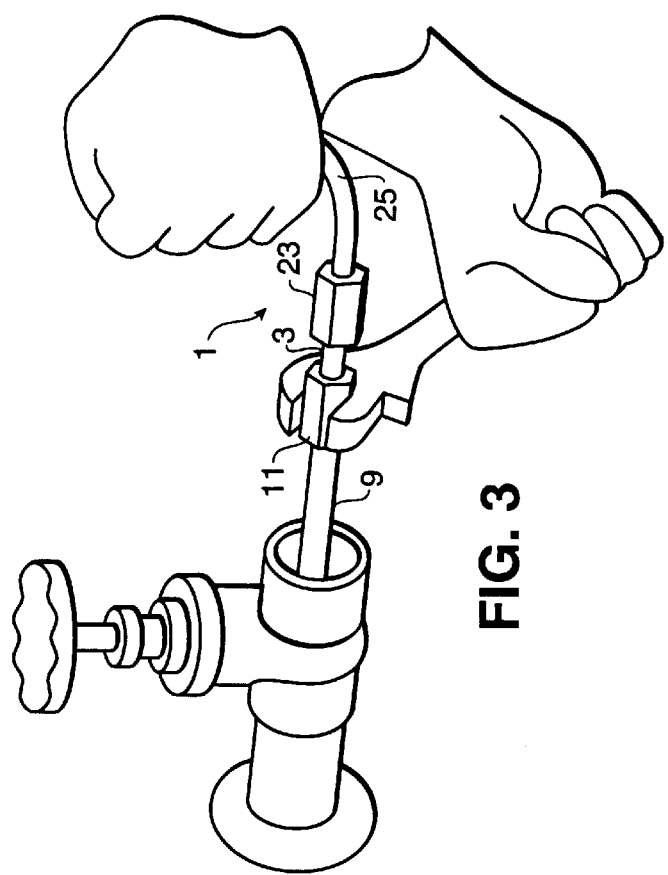
FIG. 3 is a perspective view illustrating the improved plumbing tool of the present invention being inserted through the bore of a gate valve and into the bore of a water or gas pipe.

As illustrated in FIGS. 3 & 4, in operation, the plumbing tool 1 is inserted through the open bore of a pipe valve and into the bore of a water or gas pipe. Relative rotation of the first nut 11 with respect to the elongate threaded rod 3 advances the nut toward the distal end of the rod. In doing so, the nut 11 bears on the hollow sleeve 9 and transmits compressive force through washer 13 against the proximal end of the cylindrical gasket 21. Since the distal end of the cylindrical gasket 21 is restrained by stop 15, the gasket expands radially, thereby obstructing the water or gas pipe. Relative rotational movement between the elongate threaded rod 3 and the first nut 11 can be produced by holding the nut 11 stationary, for example, with a small wrench, and rotating the arcuate handle 25. Relative rotational movement between the elongate threaded rod 3 and the first nut 11 can also be produced by holding the arcuate handle stationary and by rotating the first nut 11.

Once the pipe is obstructed, a plumber is free to remove the unwanted valve without water flowing. The sought to be removed valve can be communicated along the length of the elongate hollow sleeve 9 and, due to its sufficiently great radius, along the length of the arcuate handle. In like manner, a new valve can be installed.

Having described my invention in such terms to enable those skilled in the art to make and use it, and having identified the presently preferred embodiment thereof, I claim:

1. In a plumbing tool for temporarily plugging a pipe which normally contains fluid or gas under pressure, said tool including:
   an elongate threaded rod having a proximal end and a distal end;
   a hollow elongate sleeve, coaxially disposed around said elongate threaded rod, intermediate said proximal and distal ends;
   a first nut threadably engaged on said elongate threaded rod, proximal of said hollow elongate sleeve;
   a gasket stop on said elongate threaded rod distal of said hollow elongate sleeve; and
   a cylindrical gasket coaxially disposed around said elongate threaded rod between said hollow elongate sleeve and said stop which expands radially when longitudinally compressed;
   the improvement in said plumbing tool in which said plumbing tool further comprises:
   an arcuate handle having a proximal end and a distal end, said arcuate handle extending proximally from said proximal end of said elongate threaded rod;
   said arcuate handle having a radius sufficiently great and said elongate threaded rod, said hollow elongate sleeve and said first nut being sized and configured to permit valves to be telescopically received on said proximal end of said arcuate handle and communicated along the entire length of said arcuate handle to be thereafter telescopically communicated along the length of said hollow elongate sleeve.

2. The plumbing tool of claim 1 wherein said arcuate handle extends proximally from said proximal end of said elongate threaded rod in a curved path such that the axis of said proximal end of said arcuate handle extends substantially perpendicular to the axis of said elongate threaded rod.

3. The method of removing a pipe valve from a pipe comprising the steps of:
   inserting the distal end of a plumbing tool through the bore of a pipe valve and into the bore of a pipe, the plumbing tool including:
   an elongate threaded rod having a proximal end and a distal end;
   a hollow elongate sleeve, coaxially disposed around said elongate threaded rod, intermediate said proximal and distal ends;
   a first nut threadably engaged on said elongate threaded rod, proximal of said hollow elongate sleeve;
   a gasket stop on said elongate threaded rod distal of said hollow elongate sleeve;
   a cylindrical gasket coaxially disposed around said elongate threaded rod between said hollow elongate sleeve and said stop which expands radially when longitudinally compressed;

an arcuate handle having a proximal end and a distal end, said arcuate handle extending proximally from said proximal end of said elongate threaded rod; and said arcuate handle having a radius sufficiently great to permit valves to be telescopically received on said proximal end of said arcuate handle and communicated along the entire length of said arcuate handle to be thereafter telescopically communicated along the length of said hollow elongate sleeve;

rotating the first nut relative to the elongate threaded rod to advance the first nut toward the distal end of the elongate threaded rod;

compressing and radially expanding the cylindrical gasket to obstruct the pipe;

disengaging the pipe valve from engagement with the pipe;

communicating the pipe valve along the entire length of the plumbing tool for removal of the pipe valve;

rotating the first nut relative to the elongate threaded rod to advance the first nut toward the proximal end of the elongate threaded rod; and removing the distal end of the plumbing tool from the bore of the pipe.

4. The method of removing a pipe valve from a pipe of claim 3 further comprising the steps of:

communicating a second pipe valve along the entire length of the plumbing tool for engagement of the second pipe valve with the pipe; and engaging the second pipe valve to the pipe.

* * * * *